UNITED STATES PATENT OFFICE.

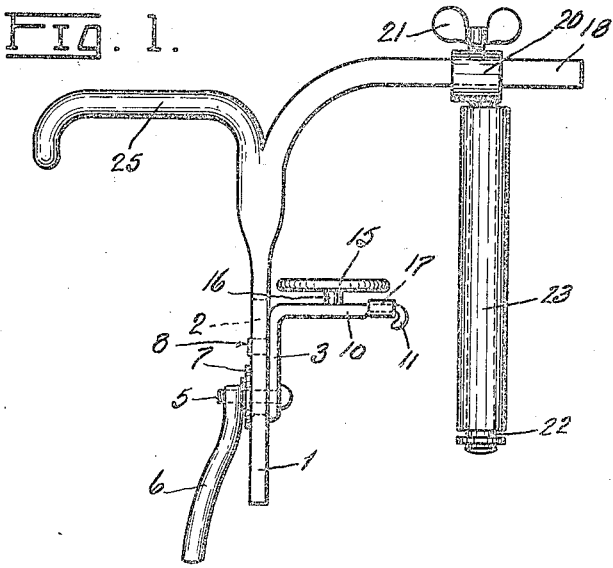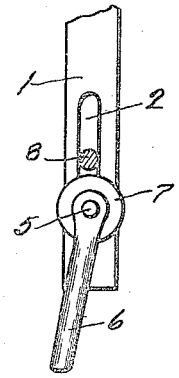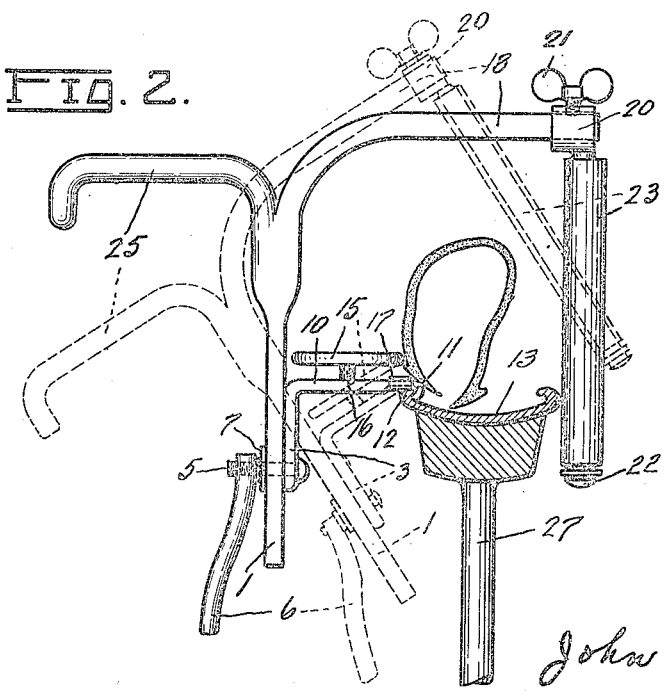

JOHN HOFFER, OF CARLISLE, WASHINGTON.

TIRE-MOUNTING DEVICE.

1,372,660.   Specification of Letters Patent.   Patented Mar. 22, 1921.

Application filed September 26, 1919. Serial No. 326,668.

*To all whom it may concern:*

Be it known that I, JOHN HOFFER, a citizen of the United States, residing at Carlisle, in the county of Lewis and State of Washington, have invented certain new and useful Improvements in Tire-Mounting Devices, of which the following is a specification.

This invention relates to improvements in devices for mounting pneumatic tires on rims. The object of the invention is the provision of simple and inexpensive apparatus whereby a pneumatic tire may be readily forced into its operative position upon a wheel-rim preparatory to inflation.

The device is especially designed to mount a tire upon rims of the clencher type which are usually secured rigidly to the fellies of the automobile wheel and it is particularly adapted for use with tires and rims of the well-known Ford type.

The invention consists in the novel construction of a tire mounting device and the adaptation and combination of parts and devices for effecting the above-named object, as will be fully explained in the following specification, illustrated in the accompanying drawings, and finally pointed out in the appended claims.

In said drawings, wherein like parts are indicated by similar reference numerals in the several views, Figure 1 is a view in side elevation of an embodiment of my invention; Fig. 2 is a view similar to Fig. 1 illustrating the manner of employment of the device when mounting a tire; Fig. 3 is a fragmentary rear elevational view of a detail of the invention.

Referring to said views, the reference numeral 1 designates a flat shank of malleable iron or other suitable material, provided with a vertically disposed slot 2. Upon the inner side of said shank a bracket 3 is mounted and adjustably secured by a screw-bolt 5 projecting through said slot 2 and arranged to be clamped into any desired position within the scope of said slot by a screw clamping member 6 coöperating with said bolt 5, a washer 7 being employed between the clamp 6 and the shank.

Bracket 3 is provided with a guide stud 8 entering said slot to maintain the bracket in alined position upon the shank. The bracket is formed with an arm 10 at right angles to its lower portion and terminating in a hook 11 adapted to grasp the inturned flange 12 of a tire-rim 13. Said arm is further provided with a bearing wheel 15 of relatively large diameter arranged to turn in a plane parallel with the arm 10 and mounted upon a vertically disposed stud 16. Positioned between said stud 16 and the hook 11 is a roller 17 designed to bear upon the curved outer face of the rim flange 12 to reduce friction.

18 indicates an inwardly projecting bar extending generally at right angles to the shank 1 and of rectangular configuration in cross-section upon which is removably mounted a block 20 having a rectangular aperture for the reception of said bar.

A thumb screw 21 serves to secure said block in set position upon said bar. Depending from said block is a rod 22 having an anti-friction roller 23 mounted thereon. 25 indicates a handle whereby the device may be manipulated in mounting a tire.

The operation of the device may be explained as follows:

The tire 26 to be mounted upon the rim 13 which is rigidly connected to the wheel 27, is positioned upon the outside of the rim as symmetrically as practicable, and that portion of the tire adjacent the valve stem of its inner tube forced over the rim by hand and the valve-stem is inserted through the aperture in the rim and wheel-fellies provided therefor. At the same time that portion of the tire directly opposite the valve-stem is likewise forced over the rim as far as possible by hand and held in such position until the tire mounting device is adjusted. This is accomplished by removing block 20 from the bar 18 hooking the hook 11 over the rim flange 12 adjacent the valve stem of the tire where the latter has been pushed inwardly over the rim flange; the wheel 15 will then engage the groove in the tire above the clencher-bead thereof while the roller 17 will be positioned to engage the top of the rim-flange 12. The device is then straightened up and the block 20 reengaged with the bar 18 which projects over the top of the tire so that the roller 23 will engage the inner flange of the rim and the thumb-screw 21 will be screwed down to secure the block rigidly in such position.

The device is then manipulated around the tire with the roller 17 rolling over the flange 12 and the wheel 15 engaging the groove above the tire-bead while the roller 23 engages the flange 12 upon the opposite side of the rim, with the result that the tire beads will be forced over the flanges and the tire will lay in proper position within the rim.

Adaptability of the device to fit any tire is provided for through the vertical adjustment of the bracket upon the shank 1 and the lateral adjustment of the block 20 and roller 23 upon the bar 18.

Having described my invention, what I claim, is—

In a tire mounting device of the class described, a vertically disposed shank, a bracket on said shank including an arm disposed at right angles to said shank, said arm terminating in a hook, a wheel mounted on said arm rotatable in the said plane as said arm, a roller mounted on said arm between the wheel and the hook, a bar at right angles to said shank, a block removably connected to said bar, and a roller depending from said block.

Signed at Carlisle this 13th day of September, 1919.

JOHN HOFFER.